United States Patent
Minshall

(10) Patent No.: US 6,884,008 B2
(45) Date of Patent: Apr. 26, 2005

(54) REAMER AND BLADE THEREFOR

(75) Inventor: Gerald Minshall, Alcester (GB)

(73) Assignee: Bencere Elliott, LTD, Banbury (GB)

(*) Notice: Subject to any disclaimer, the term of this patent is extended or adjusted under 35 U.S.C. 154(b) by 222 days.

(21) Appl. No.: 10/280,386

(22) Filed: Oct. 25, 2002

(65) Prior Publication Data

US 2003/0082021 A1 May 1, 2003

(30) Foreign Application Priority Data

Oct. 26, 2001 (GB) .............................................. 0125690

(51) Int. Cl.[7] .............................................. B23C 5/22
(52) U.S. Cl. ........................ 407/113; 407/37; 407/103
(58) Field of Search ................... 408/153, 181, 408/187, 188, 190, 713; 407/37, 48, 103, 113

(56) References Cited

U.S. PATENT DOCUMENTS

| 1,831,371 | A | * | 11/1931 | Smith | 408/188 |
| 2,435,287 | A | * | 2/1948 | Miller | 407/37 |
| 3,798,724 | A | * | 3/1974 | Czopor | 407/93 |
| 3,880,545 | A | * | 4/1975 | Kress | 408/153 |
| 4,102,594 | A | * | 7/1978 | Kress et al. | 408/186 |
| 4,611,959 | A | * | 9/1986 | Kress et al. | 408/180 |
| 4,850,757 | A | * | 7/1989 | Stashko | 408/179 |
| 5,391,023 | A | * | 2/1995 | Basteck | 408/146 |
| 5,478,178 | A | * | 12/1995 | Pawlick | 408/153 |
| 5,924,826 | A | * | 7/1999 | Bystrom et al. | 407/103 |
| 6,146,060 | A | * | 11/2000 | Rydberg et al. | 407/40 |
| 6,220,794 | B1 | * | 4/2001 | Calamia et al. | 407/40 |
| 2003/0210961 | A1 | * | 11/2003 | Arvidsson | 407/48 |

FOREIGN PATENT DOCUMENTS

| DE | 3617119 A1 | * | 11/1987 | ........... B23B/27/16 |
| GB | 570452 | * | 7/1945 | |
| GB | 938058 | * | 9/1963 | |

* cited by examiner

Primary Examiner—Daniel W. Howell
Assistant Examiner—Michael W. Talbot
(74) Attorney, Agent, or Firm—Paul E Milliken; Ray L Weber

(57) ABSTRACT

A cutting blade 16, and a method of securing the blade 16 in a reamer 11 having an axial recess 19 in the body 13 of the reamer. The cutting blade 16 has parallel serrations 35 in its rear face 37 extending normally of each cutting edge 34 and is clamped to mutually interengagable parallel serrations 36 on the reamer 11 which extend radially thereof. The cutting edge 34 of the blade 16 is adjusted to a new position by movement of the blade along the radial serrations 36 using a single adjuster means 42.

9 Claims, 2 Drawing Sheets

REAMER AND BLADE THEREFOR

This invention relates to reamers and boring tools and to a method of accurately locating the cutting edge of blades in a reamer or boring tool.

BACKGROUND OF THE INVENTION

Reamers typically have elongate blades clamped in position in an axial slot or recess in a reamer body and the radial position of the blade relative to the reamer body is adjusted by means of a pair of adjustment screws that act directly against the blade to move the blade substantially radially. Such an arrangement is shown in U.S. Pat. No. 4,547,102 assigned to Cogsdill Tool products Inc.

The above arrangement has a disadvantage that when the blade is moved by adjustment of either or both adjustment screws the blade may tilt by small amounts so that the cutting edge not within accepted tolerances over its whole length and the blade may also move axially relative to the reamer body as it is moved radially. These very small movement of the blade are unacceptable when machining to very small tolerances of upto 50 microns. This means that accurate adjustment of the blade is a time consuming process achieved by trial and error.

It is also known from U.S. Pat. No. 5,211,516 to mount a cutting blade on a boring tool using a clamping shoe which engages in parallel grooves present on the front face of the blade.

OBJECT OF THE PRESENT INVENTION

The present invention provides a cutting blade that can be accurately adjusted radially by means of a single adjuster screw and which allows for cutting edges and/or blades of reamers to be changed with minimum down time.

STATEMENT OF INVENTION

According to a first aspect of the present invention there is provided a planar reamer blade having a front face with a plurality of cutting edges thereon and a rear face having a plurality of serrations thereon comprising serrations normal to each cutting edge.

For the purposes of this invention the term "reamer" is also intended to include fine boring tools.

The blade is provided with a hole, or dimple therein, in use accommodating a clamping screw, the screw either passing through said hole, or having its head engaging in the dimple.

The blade may have between two to six cutting edges, but is preferably square, or substantially square, preferably having four cutting edges and the rear of the blade is provided with two sets of intersecting serrations.

The serrations may have many different forms including symmetrical wave form such as sinusoidal waves, zig-zag forms, corrugations, and non symmetrical serrations.

Also according to the invention there is provided a reamer comprising a body having head with an axial recess therein with a blade according to a first aspect of the invention mounted therein, the serrations on the rear of the blade mutually interengaging with radial serrations on the reamer to secure the blade against axial movement.

The cutting blade is adjustable in a radial direction by means of a single screw threaded adjuster. The interengaging serrations preventing the blade from tipping. The serrations on the reamer can be formed on a face of the recess, or alternatively on a removable carrier which is mounted in the recess.

The blade is secured to said face by a clamping screw, preferably passing through said hole, or a clamp down plate.

With a square blade, each of the four cutting edges can be utilised by unclamping the blade to release the interengaging serrations and then rotating the blade as desired and re-engaging the serrations.

There is further provided a method of securing a cutting blade in a reamer wherein the blade is located in an axial recess in the body of the reamer, the cutting blade having serrations in its rear face and being clamped against mutually interengagable parallel serrations on the reamer which extend radially thereof, with the cutting edge of the blade being adjusted to a new position by movement of the blade along the radial serrations on the reamer using adjuster means.

The blade edge can be changed or the blade changed, simply by removing the blade from the carrier and relocating said blade, or another identical blade on the serrations, to provide a new cutting edge, with the mutually interengaging serrations ensuring re-alignment of said cutting edge.

DESCRIPTION OF DRAWINGS

The invention will be described by way of example and with reference to the accompanying drawings in which.

DETAILED DESCRIPTION OF AN EMBODIMENT OF THE INVENTION

Figure 1:
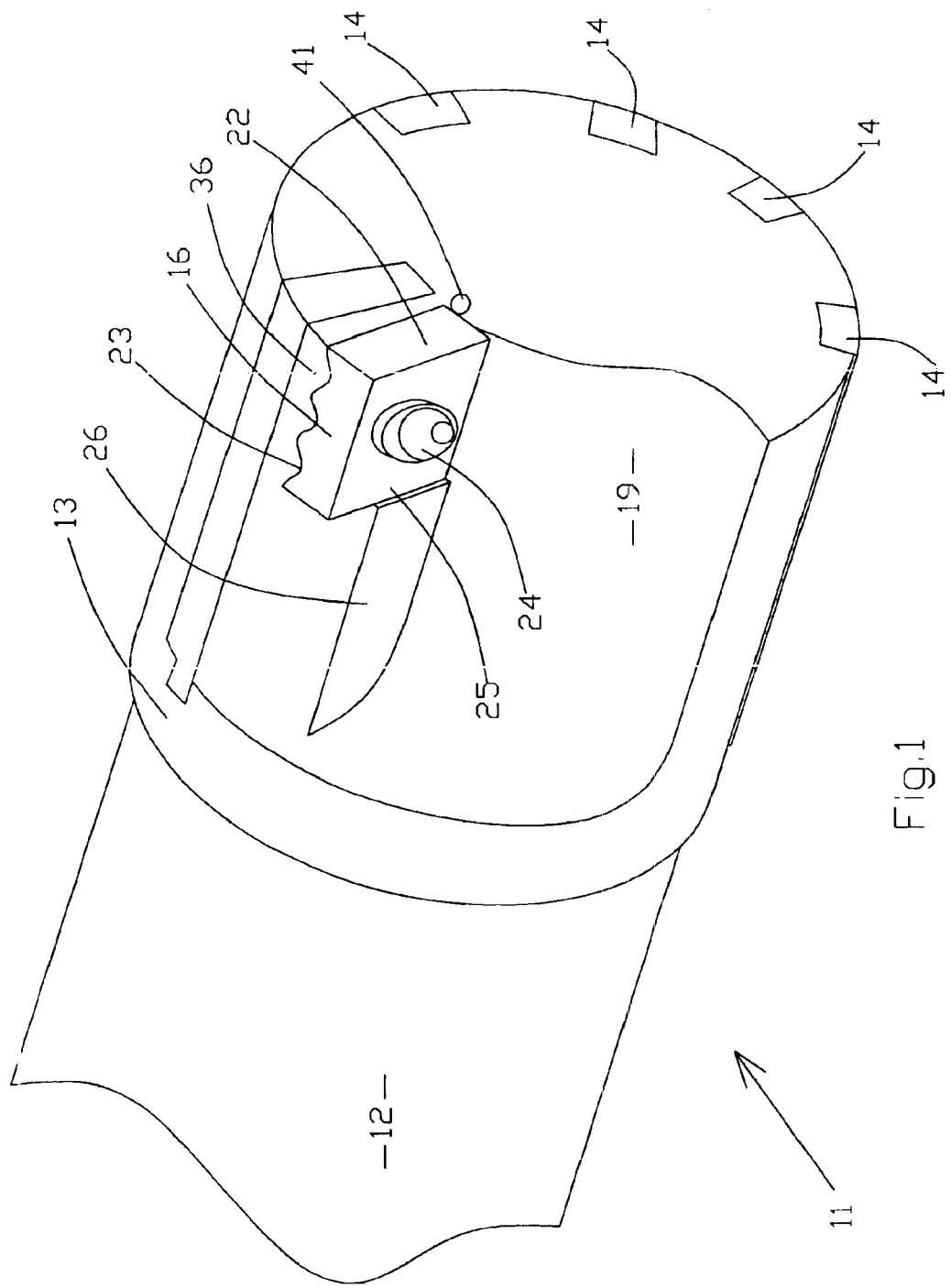
FIG. 1 is an isometric view of a reamer according to the present invention.
Figure 2:
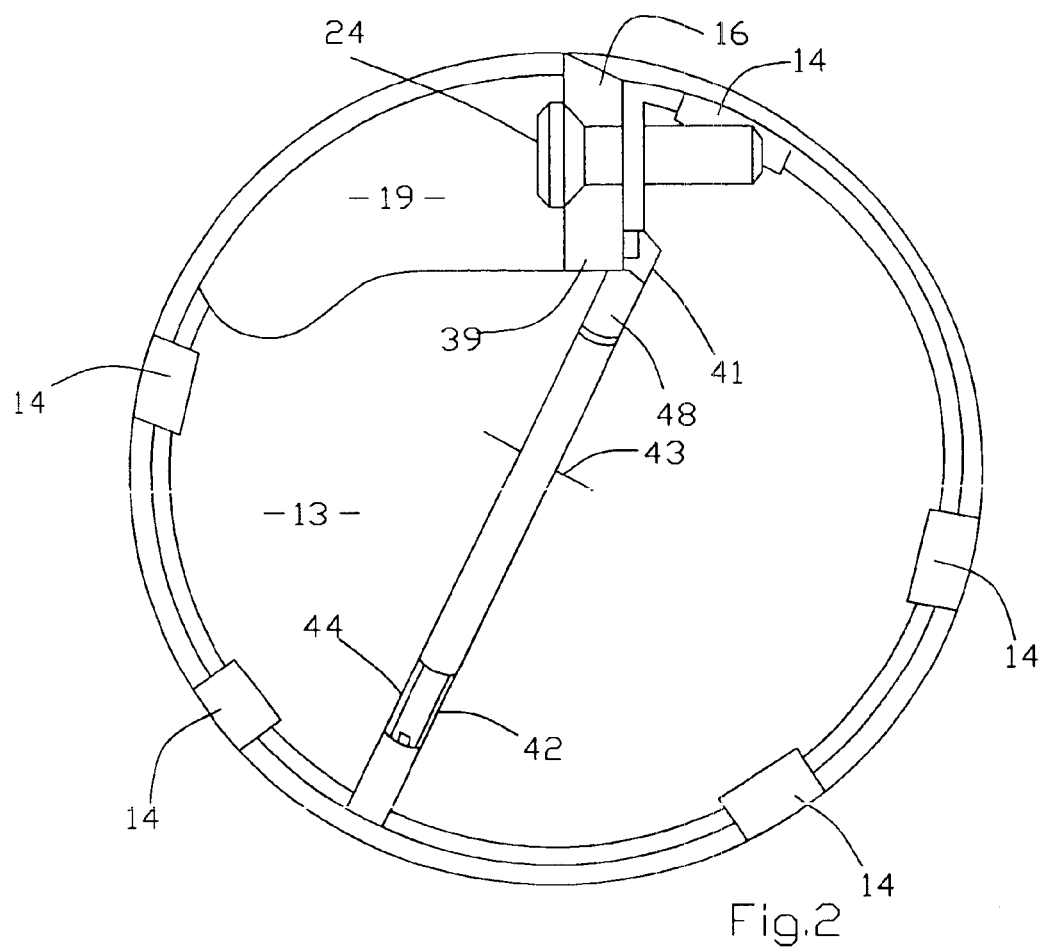
FIG. 2 is a transverse section of the assembled reamer of FIG. 1.

With reference to FIGS. 1 and 2 of the drawings, there is shown a reamer 11 having a shank 12 which in use is clamped into a machine tool for rotation of the reamer, or workpiece, about its longitudinal axis.

The reamer 11 has a cylindrical head 13 which carries at least one cutting blade 16 each of which arranged in a respective recess 19 located in the periphery of the head 13. The head 13 also has a plurality of axially extending centring pads 14 spaced around the head. If two blades 16 are utilised these may be arranged diametrically opposite each other.

For the sake of simplicity, although the reamer may include more than one blade 16, the invention will be described in detail with reference to one blade only, any other blade being substantially identical. The blade 16 is oriented radially of the head 13 one radial side 26 of the recess 19 has a notch 22 formed at its axially outer end into which a cutting blade 16 is secured by a clamping screw 24. The notch 22 has a shoulder 25 formed at its inner end and which is spaced from the adjacent side of the blade 16, and a side face 23 against 25 which the blade is clamped.

Figures 3, 4:
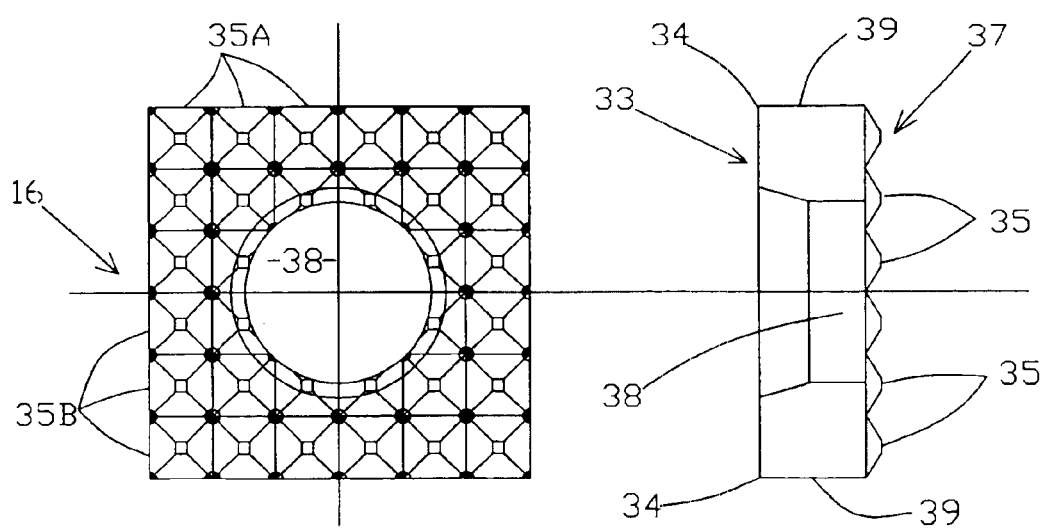
FIG. 3 is a plan view of a cutting blade according to the present invention.
FIG. 4 is a side elevation of the blade in FIG. 3.

With reference now to FIGS. 3 & 4 in particular, the blade 16 is a substantially square planar shape having four sides 39, a front face 33 with at least two, and preferably four cutting edge 34 thereon, and a rear face 37 having a plurality of serrations 35 thereon. The serrations 35 comprise serrations which extend substantially normal to the cutting edges 34 for the full length of the blade 16. In the present example with four cutting edges 34 one set of serrations 35A extends transversely of the other set of serrations 35B so that the serrations 35A & 35B intersect each other forming separate pyramidal projections. With two cutting edges on opposite sides of the blade, the serrations 35 extend only between said opposite sides.

The serrations 35 on the rear face 37 of the blade interengage with like serrations 36 on the radial face 23 of the notch 22. In this example, the serrations 35 & 36 are in the form of flat sided straight ribs of a triangular cross-section with the included angle at the apex being between 45–90 degrees of arc, preferably about 60 degrees of arc. The serrations have a pitch of between 1.00 mm and 1.75 mm, and the tops of the ribs are chamfered. An axially extending clearance hole 41 is provided at the intersection of the side face 23 of the notch, and the radially inner side of the notch.

The blade 16 is held in the notch by the screw 24 which passes through a hole 38 in the blade 16 to engage in a threaded hole in the head 13. The blade 16 is held in the notch 22 so that the serrations 35 & 36 are hard in abutment with each other, so that any loads on the blade are transmitted to the reamer body through the interengaged serrations.

The inner facing side 39 of the blade abuts against at least one adjuster 42. Each adjuster 42 comprises a tapered wedge 48 which is moveable in a chordal bore 43, by means of an adjuster screw 44 for radial adjustment of the height of the cutting edge 34. The total adjustment range will be about 0.5 mm. There is sufficient clearance between the screw 24 and the bore 38 to cater for the radial adjustment of the blade.

When a blade 16 is first fitted to a reamer, the blade is set to the correct radial adjustment by the conventional trial and error technique by adjustment of position of the blade. The blade is typically set to an accuracy of between 3–5 microns. Thereafter if it is desired to renew the cutting edge 34, the blade having the edge thereon is removed from the notch 22 by removal of the screw 24. The blade 16 is then re-positioned to provide a new edge, or replaced by a new identical blade. Since the serrations 35 on the back face of any blade are precision ground therein relative to the cutting edge(s) the new blade when fitted to the reamer will provide an accurately axially positioned cutting edge and therefore needs only to be radially adjusted.

The blade 16 may be mounted on a carrier (not shown) and the assembled blade 16 and carrier are secured in the respective recess 19.

What is claimed is:

1. A planar reamer blade, the blade being substantially square and having a front face with four cutting edges extending along the sides thereof and a rear face having a plurality of serrations thereon comprising two sets of intersecting serrations, each set of serrations extending substantially parallel to two of said cutting edges and normal to the other two of said cutting edges and extending fully across the rear face of the blade.

2. A blade as claimed in claim 1 wherein the blade is provided with a hole or dimple which in use accommodates a clamping screw.

3. A reamer comprising a body having head with an anxially recess therein with a planar reamer blade mounted therein, the blade being substantially square and having a front face with four cutting edges extending along the sides thereof and a rear face having a plurality of serrations thereon comprising two sets of intersecting serrations, each set of serrations extending substantially parallel to two of said cutting edges and normal to the other two of said cutting edges and extending fully across the rear face of the blade, the blade being mounted on the reamer with a cutting edge extending axially of the reamer and the serrations on the rear face of the blade mutually interengaging with radial serrations on the reamer to secure the blade against axial movement.

4. A reamer as claimed in claim 3 in which the cutting blade is adjustable in a radial direction by means of a single screw threaded adjuster.

5. A reamer as claimed in claim 3, wherein the serrations on the reamer are formed on a face of the recess.

6. A method as claimed in claim 3, wherein, each of the four cutting edges can be utilized by unclamping the blade to release the interrengaging serrations and then rotating the blade as desired and reengaging the serrations.

7. A reamer as claimed in claim 3, wherein the serration on the reamer are formed on a carrier which is mounted within a recess on the reamer.

8. A method of securing a blade as within a reamer having an axial recess in the body of the reamer, and the blade being substantially square and having a front face with four cutting edges extending along the sides thereof and a rear face having a plurality of serrations thereon comprising two sets of intersecting serrations, each set of serrations extending substantially parallel to two of said cutting edges and normal to the other two of said cutting edges and extending fully across the rear face of the blade, wherein in said method the cutting blade is clamped within the recess to mutually interengagable parallel serrations provided on the reamer and which extend radially thereof, with a cutting edge of the blade extending axially of the reamer being radially adjustable to a new position by movement of the blade along the radial serrations using a single adjuster means.

9. A method as claimed in claim 8, wherein the blade is changed simply by removing the blade from the reamer and relocating another identical blade on the serrations.

* * * * *